United States Patent [19]

Katoh

[11] Patent Number: 4,502,113
[45] Date of Patent: Feb. 26, 1985

[54] SYSTEM FOR CHECKING AN ELECTRICAL CONNECTION BETWEEN A COMPUTER AND A PRINTER

[75] Inventor: Haruhisa Katoh, Tokyo, Japan

[73] Assignee: Canon Kabushiki Kaisha, Tokyo, Japan

[21] Appl. No.: 366,575

[22] Filed: Apr. 8, 1982

[30] Foreign Application Priority Data

May 26, 1981 [JP] Japan .................. 56-80621

[51] Int. Cl.$^3$ .............................................. G06F 3/12
[52] U.S. Cl. ........................................ 364/200; 371/20
[58] Field of Search ... 364/200 MS File, 900 MS File, 364/405, 406, 519; 178/23 R, 23 A; 371/16, 20

[56] References Cited

U.S. PATENT DOCUMENTS

| | | | |
|---|---|---|---|
| 3,215,778 | 11/1965 | Abramson | 178/23 R |
| 3,810,109 | 5/1974 | Morris et al. | 364/200 |
| 4,162,396 | 7/1979 | Howard et al. | 371/20 |
| 4,166,290 | 8/1979 | Furtman et al. | 364/200 |
| 4,179,732 | 12/1979 | Khan et al. | 364/200 |
| 4,365,334 | 12/1982 | Smith et al. | 371/20 |
| 4,371,950 | 2/1983 | Chadra | 364/900 |

OTHER PUBLICATIONS

Maholick et al., "A Communication Structure for Printer Control", *IEEE National Telecommunications Conference*-1981, pp. E.4.2.1-E.4.2.5.

McCarthy, *IBM Technical Disclosure Bulletin*, "Diagnostic Hardware and Process for I/O Interfacing Devices", vol. 12, No. 8, Jan., (1980), pp. 1230-1231.

Kulka et al., *IBM Technical Disclosure Bulletin*, "Diagnostic Procedures", vol. 14, No. 9, Feb. 1972, pp. 2749-2750.

Bodner et al., *IBM Technical Disclosure Bulletin*, "System Initialization Check", vol. 17, No. 7, Dec. 1974, pp. 2107-2108.

*Primary Examiner*—Jerry Smith
*Assistant Examiner*—Gary V. Harkcom
*Attorney, Agent, or Firm*—Fitzpatrick, Cella, Harper & Scinto

[57] ABSTRACT

In an electronic computer having a main frame including a keyboard and a processing unit, and a separable printer unit, a checking mechanism for checking if the printer unit is correctly connected to the main frame of the electronic computer is provided. The print operation is permitted only when the correct connection of the printer unit is detected by the checking mechanism.

6 Claims, 4 Drawing Figures

SYSTEM FOR CHECKING AN ELECTRICAL CONNECTION BETWEEN A COMPUTER AND A PRINTER

BACKGROUND OF THE INVENTION

1. Field of the Invention

The present invention relates to an electronic computer, and more particularly to a checking mechanism in an electronic computer, having a main frame and a separable printer unit, for checking if the printer unit is correctly connected to the main frame of the electronic computer.

2. Description of the Prior Art

In a prior art electronic computer having a separable printer unit, a checking mechanism is not provided for checking if the printer unit is correctly connected to the main frame of the electronic computer and is operating correctly. Accordingly, abnormal conditions of the connection of the printer unit to the main frame of the computer such as misconnection of the printer unit or loosening of a connector by vibrations during the operation of the computer cannot be readily checked. As a result, if the computer is operated with an abnormal condition in the connection, the printing operation is carried out incorrectly.

In order to overcome the difficulty encountered with abnormal state of the connection, the connection can be checked by providing a checking mechanism at each connecting terminal to the printer unit. However, in this method, as many checking mechanisms as there are terminals to be checked for the connection are required and hence the cost is substantially increased as the number of connection terminals increases.

SUMMARY OF THE INVENTION

It is an object of the present invention to provide a checking system for the connection between an electronic computer and a printer unit connected via a plurality of signal lines. This system checks signals of the same category with a single checking mechanism.

DETAILED DESCRIPTION OF THE PREFERRED EMBODIMENTS

Figure 1:
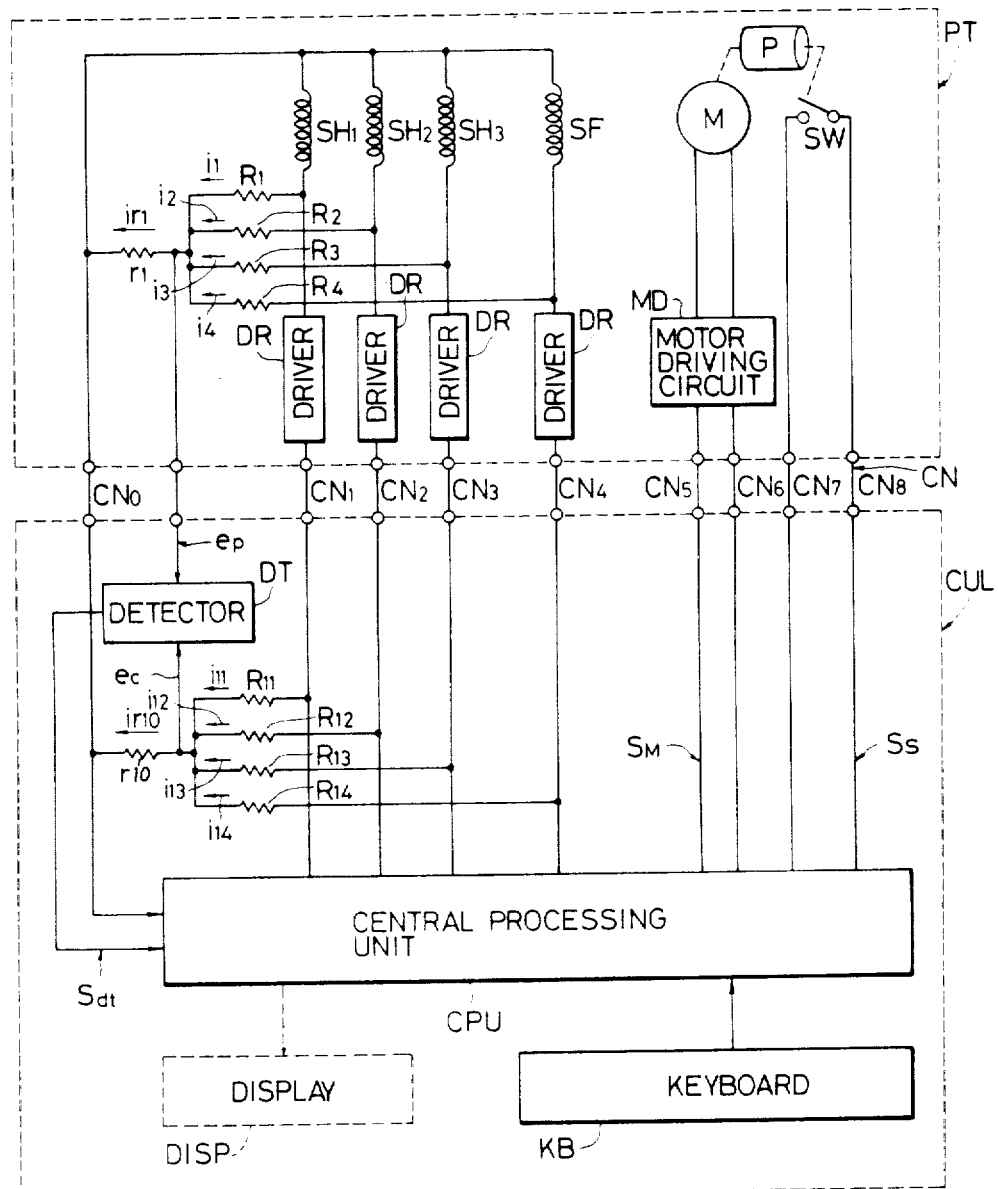
FIG. 1 shows one embodiment of the present invention.

FIG. 1 shows one embodiment of the present invention. A printer unit PT and an electronic computer main frame CUL are connected via connecting terminals CN. The printer unit PT may be a conventional line printer which comprises hammer solenoids $SH_1$, $SH_2$ and $SH_3$, a paper feed solenoid SF, drive circuits DR for the solenoids, a type drum P, a type drum drive motor M, a type drum position sensing switch SW linked to the type drum P, and a drive circuit MD for the motor M. A circuit comprising resistors $R_1$, $R_2$, $R_3$, $R_4$ and $r_1$ detects an abnormal state of the connection of the printer PT to the main frame CUL. The electronic computer main frame CUL comprises a keyboard KB, a central processing unit CPU and a display unit DISP. A compare/detection circuit DT and resistors $R_{11}$, $R_{12}$, $R_{13}$, $R_{14}$ and $r_{10}$ also detect the abnormal state of the connection.

Figure 2:
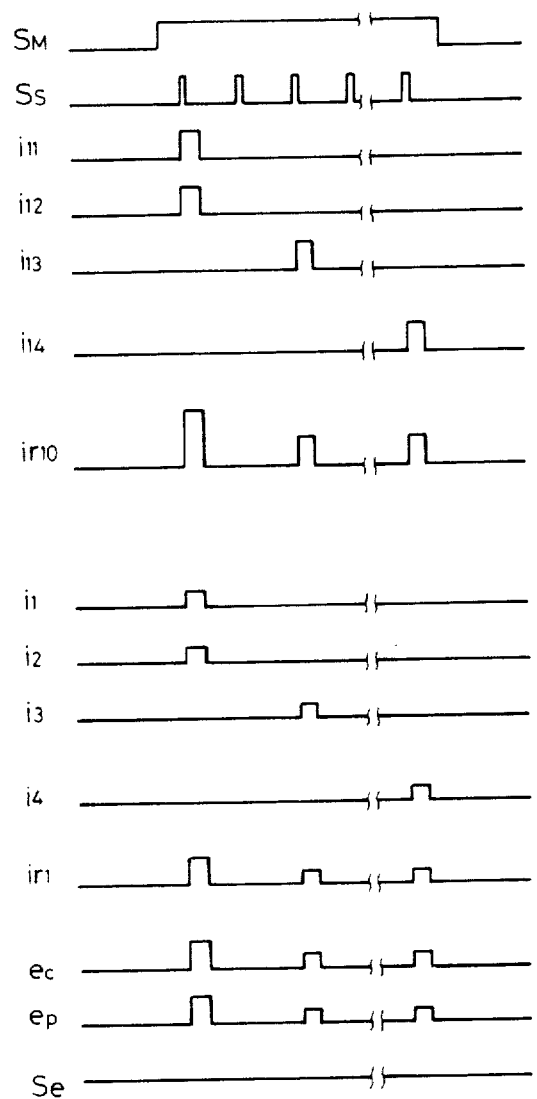
FIGS. 2 and 3 show timing charts for explaining the operation of the present invention.
Figure 3:
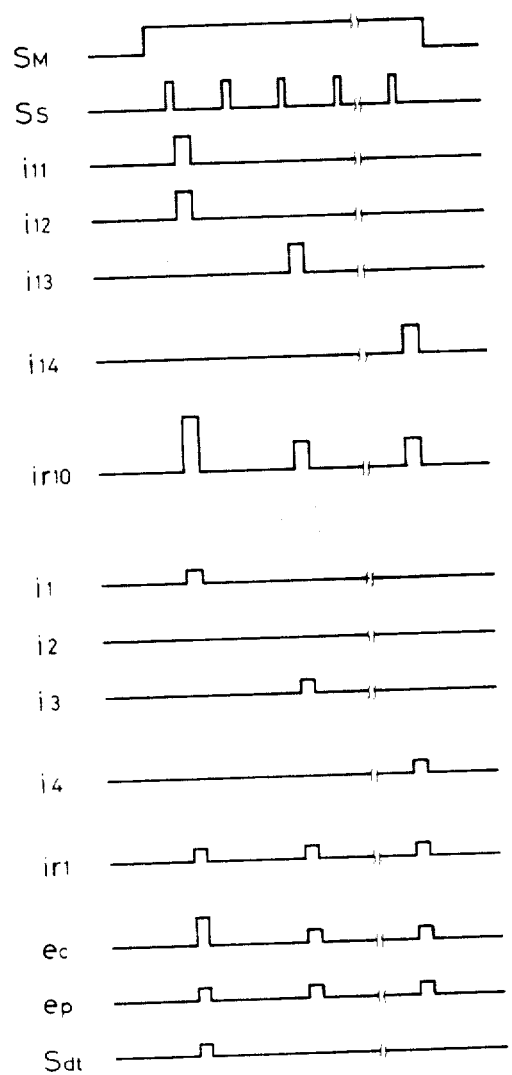

FIGS. 2 and 3 show timing charts for explaining the operation of FIG. 1. FIG. 2 shows the timing chart where the printer unit PT and the electronic computer main frame CUL are correctly connected by the connecting terminals CN.

Referring to FIGS. 1 and 2, after the central processing unit CPU has processed in accordance with input data from the keyboard KB, it starts the print operation. The central processing unit CPU sends a drive signal SM to the type drum drive motor M to rotate it, and the type drum position sensing switch SW linked thereto is actuated to send a timing signal $S_s$ to the central processing unit CPU. The central processing unit CPU generates hammer solenoid drive signals and a paper feed solenoid drive signal in synchronism with the timing signal $S_s$. As the hammer solenoid drive signals are generated, currents $i_{11}$, $i_{12}$ and $i_{13}$ flow through the resistors $R_{11}$, $R_{12}$ and $R_{13}$, respectively, and as the paper feed solenoid drive signal is generated, a current $i_{14}$ flows through the resistor $R_{14}$. The resistor $r_{10}$ is selected to be sufficiently smaller than the resistors $R_{11}$, $R_{12}$, $R_{13}$ and $R_{14}$ and the input impedance of the compare/detection circuit DT so that the mutual effects among the currents $i_{11}$, $i_{12}$, $i_{13}$ and $i_{14}$ can be neglected. Accordingly, the current $i_{r10}$ is expressed by a sum of mutually independent currents $i_{11}$, $i_{12}$, $i_{13}$ and $i_{14}$. That is, $i_{r10} = i_{11} + i_{12} + i_{13} + i_{14}$. An input voltage $e_c$ to the compare/detection circuit DT is expressed by $e_c = i_{r10} \cdot r_{10}$. The resistor $r_1$ is also selected to be sufficiently smaller than the resistors $R_1$, $R_2$, $R_3$ and $R_4$ and the input impedance of the compare/detection circuit DT so that a current $i_{r1}$ flowing through the resistor $r_1$ is expressed by a sum of the mutually independent currents $i_1$, $i_2$, $i_3$ and $i_4$ flowing through the resistors $R_1$, $R_2$, $R_3$ and $R_4$, respectively. That is, $i_{r1} = i_1 + i_2 + i_3 + i_4$. An input voltage $e_p$ to the compare/detection circuit DT is expressed by $e_p = i_{r1} \cdot r_1$. Since the current $i_1$ and the current $i_{11}$ are of the same waveform, they are expressed as $i_1 = k \cdot i_{11}$, where k is a proportional constant between the resistor $R_1$ and the resistor $R_{11}$. The currents $i_2$ and $i_{12}$, $i_3$ and $i_{13}$, and $i_4$ and $i_{14}$ are also of the same waveforms, respectively, and they are expressed as $i_2 = k \cdot i_{12}$, $i_3 = k \cdot i_{13}$ and $i_4 = k \cdot i_{14}$, where k is the proportional constant between the resistors $R_2$ and $R_{12}$, $R_3$ and $R_{13}$, and $R_4$ and $R_{14}$, respectively.

As a result, the current $i_{r1}$ is expressed as $i_{r1} = k \cdot i_{r10}$ and hence the input voltage $e_p$ is expressed as $e_p = k \cdot r_1/r_{10} \cdot e_c$. Accordingly, $e_p = K \cdot e_c$, where K is a proportional constant.

Accordingly, by checking if the voltage $e_p$ is equal to $K \cdot e_c$ with the compare/detection circuit DT, the normal state of the connection of the connecting terminals $CN_0$–$CN_4$ can be checked. If it is normal, an output voltage Sdt of the compare/detection circuit DT is at a low level.

FIG. 3 shows the timing chart when the connection between the printer unit PT and the electronic computer main frame CUL is abnormal. Specifically, the connecting terminal $CN_2$ is in abnormal condition. As a result, the drive signal to the hammer solenoid $SH_2$ is not transmitted and the current $i_2$ remains at a low level. As a result, the relation of $e_p = K \cdot e_c$ is not met and the compare/detection circuit DT produces a high level output voltage Sdt at the timing of the current $i_2$ to inform the central progressing unit CPU of the abnormal condition of the connection between the printer unit PT and the electronic computer main frame CUL. The central processing unit CPU in turn stops the print operation and displays the abnormal condition of the connection on the display unit DISP as required. In FIG. 3, when the output voltage Sdt is high, the print operation is conducted for one print cycle (in which the motor drive signal $S_M$ changes to a high level and then to a low level) and the next print cycle is inhibited. Alternatively, the print operation can be inhibited as soon as the output voltage Sdt assumes the high level.

In FIG. 1, the connecting terminals $CN_5$–$CN_8$ have no abnormal condition detecting circuit, but the condition of the connection of the connecting terminals $CN_5$–$CN_8$ can be checked by monitoring the timing signal $S_s$ which is periodically sent as long as the motor drive signal $S_M$ is high. In the present embodiment, the condition of the connection of the three hammer solenoids and the one paper feed solenoid is checked by the single compare/detection circuit DT. Thus, not only signals of the same category (e.g. hammer solenoid signals) but also a signal of a different category (e.g. paper feed solenoid signal) can be checked by the single compare/detection circuit DT. Any number of terminals can be checked by the single compare/detection circuit DT, and more than one compare/detection circuit may be provided. The compare/detection circuit DT may be constructed by a resistor voltage divider circuit and a differential amplifier.

Figure 4:
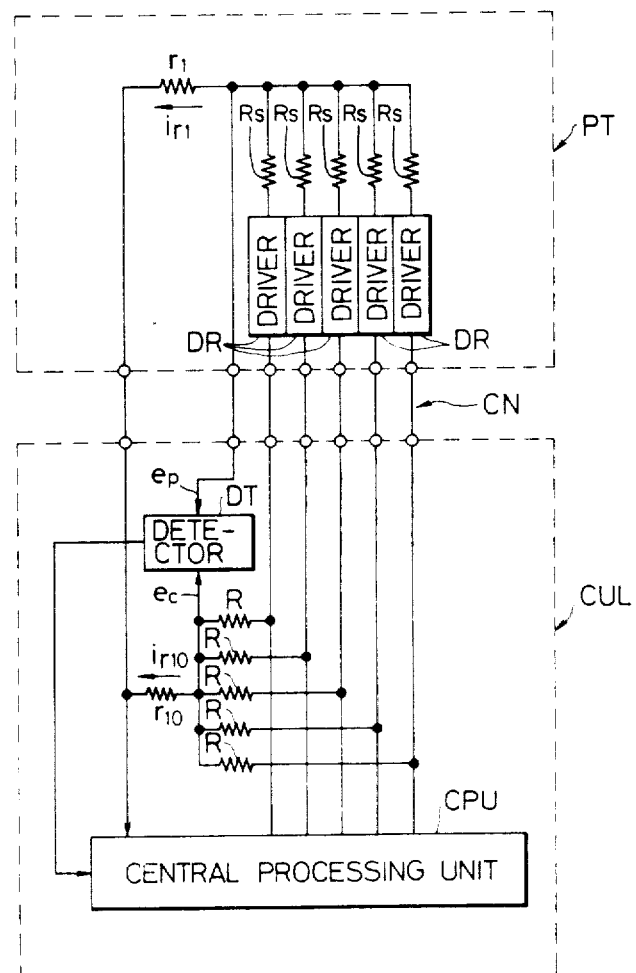
FIG. 4 shows another embodiment of the present invention.

FIG. 4 shows another embodiment of the present invention in which the present invention is applied to a thermal printer head driver. The resistor $r_1$ is selected to be sufficiently smaller than resistors $R_s$ of heat generating elements of the thermal print head of the printer unit PT. DR denotes drive circuits for the heat generating elements. The resistor $r_{10}$ in the computer main frame CUL is selected to be sufficiently smaller than resistors R. Accordingly, as in the embodiment of FIG. 1, the input voltages $e_p$ and $e_c$ to the compare/detection circuit DT are expressed by $e_p = i_{r1} \cdot r_1$ and $e_c = i_{r10} \cdot r_{10}$. If the connecting terminals CN are in the normal condition, the current $i_{r1}$ is proportional to the current $i_{r10}$ and hence $e_p = K \cdot e_c$, where K is a proportional constant. Accordingly, by checking the relationship of $e_p = K \cdot e_c$ by the compare/detection circuit DT, the condition of the connection of the connecting terminals CN can be checked, and the print operation is stopped if an abnormal condition is detected.

What I claim is:

1. An electronic system comprising:
   a central processing unit for generating driving signals;
   a printer unit detachably connected to said central processing unit and having a plurality of printing elements and a plurality of drivers each for operating a respective one of said printing elements in response to a driving signal;
   a plurality of conductive paths each electrically connecting said central processing unit to one of said drivers for conducting a driving signal thereto; and
   detecting means for detecting an incomplete electrical condition in said plurality of conductive paths, said detecting means comprising means provided in said central processing unit for generating a first signal representing a sum of said driving signals from said central processing unit, means provided in said printer unit for generating a second signal representing a sum of said output signals from the drivers, the first and second signals being generated with the same timing, and a comparator for examining coincidence in amplitude between said first and second signals to issue a signal indicative of the incomplete electrical connection condition in said conductive paths.

2. The electronic system of claim 1, wherein said means for generating said first signal comprises a first group of resistors each connected to a respective one of said drivers and means for summing the currents flowing in said resistors, said first signal being representative of the sum of the currents in said first group of resistors; and wherein said means for generating said second signal comprises a second group of resistors each connected to said central processing unit for conducting a separate driving signal therefrom, and means for summing the currents flowing in said second group of resistors, said second signal being representative of the sum of the currents in said second group of resistors.

3. The electronic system of claim 1, wherein said printer unit is a hammer type of line printer and each of said printing elements includes a hammer driving coil.

4. The electronic system of claim 1, wherein said printer unit is a thermal head type of line printer and each of said printing elements includes a heater.

5. An electronic system comprising:
   a central processing unit for generating driving signals;
   a printer unit detachably connected to said central processing unit and having a plurality of printing coils, a paper advancing coil and a plurality of drivers, one for each of said printing coils;
   a plurality of conductive paths each electrically connecting said central processing unit to one of said drivers for conducting a driving signal thereto; and
   detecting means for detecting an incomplete electrical connection in said plurality of conductive paths, said detecting means comprising means provided in said central processing unit for generating a first signal representing a sum of said driving signals from said central processing unit, means provided in said printer unit for generating a second signal representing a sum of said output signals from the drivers, the first and second signals being generated with the same timing, and a comparator for examining the coincidence in amplitude between said first and second signals to issue a signal indicative of the incomplete electrical connection condition in said conductive paths.

6. The electronic apparatus of claim 5, wherein said means for generating said first signal comprises a first group of resistors each connected to one of said drivers and means for summing the currents flowing in said resistors, said first signal being representative of the sum of the currents in said first group of resistors; and wherein said means for generating said second signal comprises a second group of resistors each connected to said central processing unit for conducting a separately driving signal therefrom, and means for summing the currents flowing in said second group of resistors, said second signal being representative of the sum of the currents in said second group of resistors.

* * * * *